United States Patent Office 3,282,997
Patented Nov. 1, 1966

3,282,997
PROCESS FOR PREPARING THIOUREAS
Joseph Levy, Paramus, N.J., assignor to Universal Oil Products Company, Des Plaines, Ill., a corporation of Delaware
No Drawing. Filed Oct. 19, 1965, Ser. No. 498,139
10 Claims. (Cl. 260—552)

This invention relates to the preparation of thioureas and more particularly to the preparation of monosubstituted thioureas by the direct reaction of amines and ammonium thiocyanate.

Thioureas are valuable chemicals having many industrial applications and are utilized, for example, as antiseptics and pesticides and as intermediates in the preparation of plastics and pharmaceuticals. Heretofore, these valuable thioureas were prepared according to a wide number of different reactions and reaction schemes, a principal one of which was the reaction of an amine salt, such as an amine hydrochloride, and ammonium thiocyanate. This reaction suffers, however, from a number of economic disadvantages and, moreover is very difficult to carry out to obtain a product of desirable purity in an acceptable yield. Many of the disadvantages of this method of preparation arise from the use of an amine salt as one of the reactants which, in addition to requiring either the prior or in situ preparation of such salt, usually requires the use of a suitable reaction diluent or solvent to effect the reaction of the amine salt with the ammonium thiocyanate. Aside, however, from these aspects which primarily adversely affect the cost of preparing the thioureas, the overriding disadvantage of this method of preparation is that the product is not readily obtainable in acceptable yield with the high purity required for further commercial utilization inasmuch as mixtures of products are usually produced which make separation and isolation of the pure product from the reaction mixture, as well as from the inorganic ammonium salt formed in the reaction, both tedious and difficult. It has now been discovered, however, that highly pure thioureas may be readily and economically prepared by directly reacting an amine with ammonium thiocyanate in a two-temperature step reaction which does not require that the amine reactant be in the form of a salt.

Accordingly, an object of this invention is to provide a new process for preparing thioureas. Another object is to provide a process for preparing thioureas which involves the direct reaction of an amine and ammonium thiocyanate. A still further object of this invention is to provide a process for preparing monosubstituted thioureas by directly reacting a primary amine and ammonium thiocyanate in a two-temperature step reaction whereby the thioureas are economically obtained in high purity.

The thioureas which are prepared according to the process of this invention may be represented by the following general structural formula:

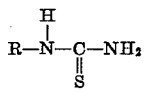

where R is selected from aliphatic, cycloaliphatic, and aryl-substituted aliphatic groups.

The thioureas having the above general structural formula are prepared according to the process of this invention by the direct reaction of an amine and ammonium thiocyanate in a two-temperature step reaction of first at a temperature of from about 25° C. to 110° C. and then at a higher temperature of from about 110° C. to 160° C.

The amine used in the reaction may be represented by the following formula:

wherein R has the same meaning as recited for the thiourea formula above. Examples of amines of the above formula utilizable in the reaction process of this invention include: alkylamines, alkenylamines, cycloalkylamines or aralkylamines such as ethylamine, butylamine, amylamine, octylamine, decylamine, cetylamine, octadecylamine, allylamine, cyclopentylamine, cyclohexylamine, benzylamine, phenylethylamine or phenylpropylamine. These amines are only representative of the class of amines having the above structural formula which may be used to prepare substituted thioureas according to the process of this invention. It should be understood, of course, that the substituent R of the amine, may be further substituted with hydroxy, alkoxy, halo or alkyl groups and examples of such further substituted amines include: ethanolamine, p-chlorobenzylamine, p-methoxybenzylamine or p-methylbenzylamine.

The preparation of thioureas according to the process of this invention by reacting an amine of the above described class with ammonium thiocyanate may be diagrammed as follows where R has the same meaning as above.

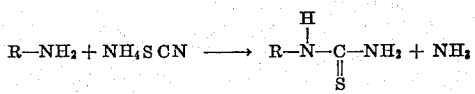

It is, of course, obvious from the above diagram that different thioureas will be prepared depending upon the particular amine reacted. Examples of the thioureas thus prepared include: N-butylthiourea, N-allylthiourea, N-β-hydroxyethylthiourea, N-octylthiourea, N-octadecylthiourea, N-cyclopentylthiourea, N-cyclohexylthiourea, N-benzylthiourea, N-phenylethylthiourea, N-p-chlorobenzylthiourea, N-p-methoxyphenylethylthiourea, or N-phenylpropylthiourea.

While the reaction of the amine and ammonium thiocyanate according to the process of this invention proceeds readily in the absence of a solvent or diluent, it may, in many instances be advantageous to conduct the reaction in a solvent or diluent. Such solvent or diluent when used should be preferably inert to the reactants and product and when a solvent is used it should be a solvent from which the product can be crystallized directly on cooling. One such highly suitable solvent is butyl alcohol which has the additional desirable feature of boiling within the temperature range of the second temperature step of the process of this invention.

In carrying out the process of this invention, which preferably is effected in a batch-type operation, the amine reactant, the ammonium thiocyanate and a solvent, if one is used, are charged to a suitable reaction vessel equipped with heating and stirring means. The reactants are then heated therein, first at a temperature within the range of from about 25° to about 110° C. and then at a higher temperature within the range of from about 110° C. to 160° C. In the first temperature step of the process, the temperature is maintained within the aforesaid range generally until the evolution of ammonia gas, a by-product of the reaction, has substantially ceased. Depending upon the particular amine reactant used, the evolution of ammonia gas usually first commences at about 25° to 30° C. although the most vigorous evolution generally occurs at a higher temperature of above about 70° C. For this reason the use of a temperature of above about 70° C. within the first temperature range is generaly preferred for the first step of the process. The time required for the first temperature step of the process, the end of which is conveniently signified by the substantial termination of the ammonia gas evolution, will vary depending upon such factors as the particular amine being reacted and the temperature; but generally ranges from about one half to two hours at the preferred temperature range of from about 70° C. to 110° C.

The second temperature step of the process is conducted at from about 110° C. to 160° C. The time required to effect the second temperature step may range from about 1 to 10 hours, and depends upon the particular amine reacted and the particular temperature utilized. The use of prolonged reaction times should be avoided in any case, however, as lengthly reaction times result in increased production of substantial quantities of yield-reducing and contaminating side-products. There is, moreover, a relationship in the second temperature step between the particular temperature used and the time; and, in general, as the temperature is increased, the time required to effect the second temperature step decreases. The optimum temperature and time utilized in the second temperature step to produce a highly pure thiourea which is readily recoverable from the reaction mixture will vary depending upon the particular amine reacted, but for many of the amines reacted according to the process of this invention, the optimum temperature ranges from about 120° C. to 135° C., and the time from about 1 to about 4 to 5 hours.

After the reaction is complete, the thiourea product may be readily recovered from the reaction mixture according to the process of this invention by conventional and economical procedures, one of which comprises crystallization from a suitable solvent and recovery of the crystallized thiourea by filtration. The thus recovered thiourea may then, if desired, be washed with a suitable organic solvent such as butyl alcohol or hexane and thereafter dried to recover a highly pure thiourea.

The quantity of reactants used in the process is not critical and generally a stoichiometric ratio of about a mol of amine per mol of ammonium thiocyanate may be satisfactorily used. When a solvent is used, such as butyl alcohol, the quantity is not important, and generally a quantity of solvent equal in weight to the total weight of the amine and ammonium thiocyanate may be satisfactorily used in most instances. The process is conveniently and advantageously effected at atmospheric pressure, but may, if desired, with suitable processing equipment be effected at super or subatmospheric pressures.

The following exampes are cited to illustrate the process of this invention, but they are not to be construed as limiting the invention to the specific reactants or conditions recited therein:

Example I

Benzylthiourea was prepared according to the process of this invention by the following procedure:

About 107 grams of benzylamine, about 76 of ammonium thiocyanate and about 162 grams of n-butyl alcohol were charged to a reaction vessel equipped with heating and stirring means. The mixture was heated with stirring and at about 30° to 35° C. evolution of ammonia gas occurred. The temperature was gradually raised to about 95° C. in about a half hour with the evolution of ammonia becoming vigorous at a temperature of about 75° C. The temperature was then raised to about 110° C. until the evolution of ammonia gas substantially ceased, a period requiring about an hour. The temperature was then raised in the refluxing temperature of the mixture (about 125° C.) and maintained thereat for about four hours. Then an additional 162 grams of n-butyl alcohol were added to the mixture and the mixture cooled to about 25° C. The crystallized product was separated from the liquid reaction mixture by filtration, washed with n-butyl alcohol and dried to recover 81.5 grams of white crystalline benzylthiourea having a melting point of 163° C. to 165° C., a purity of about 100 percent and constituting a yield of 49 percent of theory.

Example II

Dodecylthiourea was prepared according to the process of this invention by the following procedure:

About 46.3 grams of dodecylamine, about 19 grams of ammonium thiocyanate and about 40 grams of n-butyl alcohol were charged to a reaction vessel equipped with heating and stirring means. The mixture was gradually heated with stirring to about 110° C. until the evolution of ammonia gas ceased. The temperature of the mixture was then raised to about 130° C. and maintained thereat for about 2.5 hours. The mixture was then cooled to about 0° to 5° C. and the colorless crystallized product separated from the liquid reaction mixture by filtration, washed with cold n-butyl alcohol and dried to recover about 24 grams of dodecylthiourea having a melting point of 103° to 105° C., a purity of about 100 percent and constituting a yield of 39.5 percent of theory.

Example III

Benzylthiourea was prepared according to the process of this invention by the following procedure:

About 214 grams of benzylamine and about 152 grams of ammonium thiocyanate were charged to a reaction vessel equipped with heating and stirring means. The mixture was gradually heated to about 100° C. over a period of about an hour until the evolution of ammonia gas substantially ceased. The temperature of the mixture was then raised to about 125° C. and maintained thereat for about 4 hours. The mixture was then cooled and dissolved in about a liter of isopropyl alcohol at about 80° C.

The solution thus formed was then cooled to about 25° C. and the crystallized product separated from the liquid reaction mixture by filtration, washed with isopropyl alcohol and dried to recover about 133 grams of white crystalline benzylthiourea having a melting point of 162° to 165° C., a purity of 100 percent, and constituting a yield of 40 percent of theory.

I claim as my invention:

1. A process for preparing a thiourea of the formula:

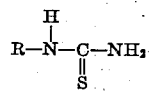

where R is selected from the group consisting of aliphatic, cycloaliphatic and aryl substituted aliphatic groups which comprise reacting an amine of the formula: R—NH$_2$ where R has the same meaning as above, with ammonium thiocyanate first at a temperature within the range of about 25° C. to 110° C. and then at a temperature of from about 110° C. to 160° C., and thereafter recovering the thiourea.

2. The process according to claim 1 wherein the amine is dodecylamine and the thiourea prepared is dodecylthiourea.

3. The process according to claim 1 wherein the amine is benzylamine and the thiourea prepared is benzylthiourea.

4. The process according to claim 1 wherein the reaction is effected in the presence of a solvent.

5. The process according to claim 4 wherein the solvent is butyl alcohol.

6. The process according to claim 1 wherein the reaction is effected first at a temperature within the range of from about 25° C. to 110° C. until the evolution of ammonia gas substantially ceases.

7. The process according to claim 1 wherein the reaction is effected first at a temperature of from about 70° C. to 110° C. until the evolution of ammonia gas substantially ceases.

8. The process according to claim 1 wherein the reaction is effected first at a temperature of from about 70°

C. to 110° C. until the evolution of ammonia gas substantially ceases and then at a temperature of from about 120° C. to 135° C.

9. A process according to claim 1 wherein benzylthiourea is prepared by reacting benylamine with ammonium thiocyanate first at a temperature of from about 70° C. to 110° C. until the evolution of ammonia gas substantially ceases and then at a temperature of from about 120° C. to 135° C. for about four hours, and thereafter recovering the benzylthiourea.

10. The process according to claim 9 wherein the reaction is effected in the presence of butyl alcohol.

No references cited.

ALEX MAZEL, *Primary Examiner.*

HENRY R. JILES, *Assistant Examiner.*